United States Patent [19]

Eschner et al.

[11] 4,436,680

[45] Mar. 13, 1984

[54] PROCESS FOR PRODUCING GRANULAR, FIRE-RESISTANT MATERIAL

[75] Inventors: Axel Eschner, Wiesbaden; Rudolf Ganz, Mainz-Gonsenheim; Günter Tkotz, Wiesbaden; Hermann Stein, Bad Dürkheim; Klaus Kreuels, Eltville, all of Fed. Rep. of Germany

[73] Assignee: Didier-Werke Ag, Wiesbaden, Fed. Rep. of Germany

[21] Appl. No.: 349,247

[22] Filed: Feb. 16, 1982

[30] Foreign Application Priority Data

Feb. 16, 1981 [DE] Fed. Rep. of Germany ....... 3105579

[51] Int. Cl.$^3$ .............................................. C04B 21/06
[52] U.S. Cl. ........................................ 264/60; 264/63; 264/66; 264/176 R
[58] Field of Search .................. 264/60, 62, 86, 63, 264/65, 176 R, 66; 501/95, 128

[56] References Cited

U.S. PATENT DOCUMENTS

| | | | |
|---|---|---|---|
| 3,014,835 | 12/1961 | Feigley | 264/86 |
| 3,016,598 | 1/1962 | Anderson | 264/62 |
| 3,030,228 | 4/1962 | Hernandez | 264/63 |
| 3,231,401 | 1/1966 | Price | 264/63 |
| 3,250,833 | 5/1966 | Wagner | 264/86 |
| 3,538,202 | 11/1970 | Bidord | 264/63 |
| 3,549,473 | 12/1970 | Le Blanc | 264/63 |
| 3,582,372 | 6/1971 | Criss | 264/63 |
| 3,708,317 | 1/1973 | Owen | 264/62 |
| 3,859,405 | 1/1975 | Horton | 264/63 |
| 3,899,555 | 8/1975 | Takao | 264/86 |
| 4,231,984 | 11/1980 | Hofmann | 264/60 |

*Primary Examiner*—John A. Parrish
*Attorney, Agent, or Firm*—Wenderoth, Lind & Ponack

[57] ABSTRACT

Granular, fire-resistant material, use thereof and process for its production, which process comprises mixing ceramic fibers, a refractory material such as clay, a phosphate bonding agent and water, to form a substantially uniformly dispersed mixture, compacting the mixture by a volume coefficient of at least 3, subjecting the compacted mixture to heat-treatment, and granulating the thus heated product.

25 Claims, No Drawings

PROCESS FOR PRODUCING GRANULAR, FIRE-RESISTANT MATERIAL

BACKGROUND OF THE INVENTION

The present invention relates to a process for producing a granular, fire-resistant (or fire-proof) material, more particularly, such material which contains ceramic fibers, a refractory such as clay, a bonding agent, and, optionally, another refractory material and/or a plasticizer.

The present invention also relates to the granular, fire-resistant material produced by this process, and the use of such material in applications where fire-resistance is desired.

The art is aware of heat-insulating, ceramic fiber bodies, made of fire-resistant or fire-proof fibers and organic or inorganic bonding agents, having low stability and high compressibility, or having increased stability, density and nondeformability. For example, German Patent Specification DE-AS 12 74 490 describes a combustion chamber for furnaces, constructed by shaping a composition containing fibers and bonding agents, in such a manner that the concentration of bonding agent varies across the cross-section of the furnace wall. This reference mentions different types of clay, alkali-silicates, aluminum phosphates and colloidal siliceous earth, in an amount of 5 to 35% (optimum of 10%) by weight, as suitable bonding agents. However, such fiber bodies are not sufficiently suited for application of high stress, since one wall surface is dense and hard, and the other, opposite, wall surface is soft and flexible.

Another German Patent Specification, DE-AS 27 32 387, discloses a process wherein a mineral fiber-board, which has been hardened in advance with an organic synthetic bonding agent, is soaked in an aqueous solution of a bonding clay and subsequently hardened through tempering.

Furthermore, DE-AS 26 18 813 discloses fiber spraying-compositions which contain, in addition to a large amount of inorganic fibers, a small amount of bonding agent and/or inorganic components as well as an additional chemical bonding agent. These fiber spraying-compositions also contain 5 to 20% by weight of an oil, to avoid dust formation. Instructions for use of these fiber spraying-compositions expressly indicate that the inorganic fibers, such as rock wool, have to be used in a loosened condition.

SUMMARY OF THE INVENTION

The object of the present invention is to provide granular, fire-resistant (or fire-proof) materials, which have a high resistance to mechanical stress and are especially suited for use as fiber spraying-compositions.

It is also an object of the invention to provide a process for producing such granular, fire-resistant materials.

Another object of the invention is to provide methods of using the granular, fire-resistant materials for applications in which fire-resistance is desired.

These objects are accomplished, in accordance with the present invention, by a process which comprises mixing ceramic fibers, a refractory material such as clay, a bonding agent and water to form a substantially uniformly dispersed mixture, compacting said mixture by a volume coefficient of at least 3, subjecting said compacted mixture to drying and/or heat-treatment at a temperature higher than merely a drying temperature and/or firing at an even higher temperature, and granulating the thus heated product.

DETAILED DESCRIPTION OF THE INVENTION

More specifically, the process for producing a granular, fire-resistant material in accordance with the present invention comprises mixing 100 parts by weight of ceramic fibers, 2 to 15 parts by weight of at least one member selected from the group consisting of clay, $Al_2O_3$,$SiO_2$, aluminum hydroxide, magnesium oxide, titanium dioxide and chromium oxide, 1 to 8 parts by weight, as $P_2O_5$, of a phosphate bonding agent, and about 2 to about 25 parts by weight of water, to form a substantially uniformly dispersed mixture; compacting said mixture by a volume coefficient of at least 3; subjecting said compacted mixture to at least one heat-treatment selected from the group consisting of drying at 110° to 180° C., heat-treating at 250° to 600° C., and firing at 800° to 1550° C.; and granulating the thus heated product.

Preferably, the uniformly dispersed mixture also contains up to 10 parts by weight of another refractory material, such as powdered porcelain or a fire-resistant clay other than the clay referred to above.

The uniformly dispersed mixture can also contain a plasticizer, in an amount of, for example, 1 to 10 parts by weight, although the amount of plasticizer used will depend on the equipment used to compact the uniformly dispersed mixture. For example, if the plasticizer is methyl cellulose, it would be preferable to use the plasticizer in an amount of 1 to 6 parts by weight. More specifically, if methyl cellulose is used, and if an extrusion press is used for compacting, the preferred amount of methyl cellulose to be used is 4 parts by weight. Preferably, half of this amount would be added as a 5% aqueous solution, and the other half would be added as dry methyl cellulose.

However, the plasticizer used in the present invention can be any known plasticizer, and it can be used in either solid form and/or as dissolved in water. Alternatively, a surface active agent can be employed.

The ceramic (or mineral) fibers employed in the present invention are conventional ceramic fibers such as rock wool or fibers of aluminum silicate containing 45 to 95% by weight of $Al_2O_3$ and are preferably no more than 10 mm in length. It is also possible to employ mixtures of different ceramic fibers.

Preferably, the ceramic fibers are employed as individual ceramic fibers, i.e. fibers which are separate from each other rather than in the form of, for example, fiber bundles.

The clay employed in the present invention can be a standard clay or a special bonding clay, both types being well known to those in the art. Preferably, bentonite is employed as the clay.

Instead of, or in addition to, using clay, it is also possible to use other finely dispersed materials such as $Al_2O_3$ and/or $SiO_2$ and/or aluminum hydroxide and/or magnesium oxide and/or titanium dioxide and/or chromium oxide, all of which are components which have long been used to improve refractory qualities.

The expression "finely dispersed" as employed above means that these components are pulverized or in a colloidal condition. In particular, when using colloidal components, such as colloidal $SiO_2$ and/or colloidal $Al_2O_3$, it is possible to use very small amounts of bonding agents, at or near the lower limit of 1 part by weight of bonding agent.

Generally, the total amount of clay, $Al_2O_3$, $SiO_2$, aluminum hydroxide, magnesium oxide, titanium dioxide and chromium oxide is 2 to 15 parts by weight per 100 parts by weight of the ceramic fibers. It is especially advantageous if the total amount of these refractory materials combined with any other refractory materials (such as powdered porcelain and/or other fire-resistant clay), when employed, is 20 parts by weight per 100 parts by weight of the ceramic fibers.

Any phosphate bonding agent employed in this art can be used in the present invention. The amount of such phosphate bonding agent is 1 to 8 parts by weight, calculated as $P_2O_5$. Examples of such bonding agents are sodium polyphosphate ($Na_{n+2}P_nO_{3n+1}$) having a polymerization degree (n) of, preferably, at least 4, more preferably, from 6 to 10. Preferably, the sodium polyphosphate is used in the form of an aqueous solution.

Another example of the phosphate bonding agent is mono-aluminum phosphate, and this can be used either in solid form, preferably powdered, or as an aqueous solution. The aqueous solution, containing 50% by weight of the phosphate, is available as a commercial product.

In the first step of the process, the ceramic fibers, clay and/or other refractory material, bonding agent and water are mixed together to form a substantially uniformly dispersed mixture. This can be accomplished in any suitable mixer, for example, a Drais turbomixer.

As indicated above, in a preferred aspect of the present invention the ceramic fibers are individual ceramic fibers which are separate from each other. To accomplish this, commercially available fibers, which are usually obtained as fiber bundles, can be placed in the turbomixer where they are broken up or separated from each other. Such a turbomixer, includes a mixing aggregate and rapidly rotating blades which break up any existing agglomerates in the commercial fibers, which at least in part are very compact, without unduly crushing or destroying the fibers.

It is also possible to mix all of the components to be incorporated in the granular, fire-resistant material, in the turbomixer. For example, the clay, a portion of the phosphate bonding agent, in solid form, and optionally, other refractory material (e.g. powdered porcelain) and plasticizer, can be mixed with the commercially available bundles of ceramic fibers in the turbomixer, making it possible to separate the fibers while at the same time obtain a particularly good uniformly dispersed mixture. Thereafter, the remainder of the bonding agent, in the form of an aqueous solution, and the balance of the water, can be added to the mixer and uniformly mixed therein.

In the next step of the process, after obtaining the substantially uniformly dispersed mixture, the mixture is compacted by a volume coefficient of at least 3. This means that the volume of the thus compacted mixture is no greater than one-third the volume of the substantially uniformly dispersed mixture obtained in the first step of the process. The highest possible degree of compacting the mixture is between 12 and 14. Preferably, the mixture is compacted by a volume coefficient of 3 to 8, the upper limit of this range representing the value for a compacted mixture which is one-eighth the volume of the original volume of the mixture obtained in the first step of the process. For some applications, volume coefficients at the lower part of the range, for example, from 3 to 6, may be desired, whereas for other applications volume coefficients at the upper part of the range, for example, from 5 to 8, may be desired.

Compacting in accordance with the present invention can be accomplished by any means which will realize at least the minimum volume coefficient of 3. For example, this can be accomplished in a rotary table press or briquetting equipment, known in the art, although any other conventional press can also be used. For example, it is possible to use an extrusion press.

The amount of water to be employed in forming the substantially uniformly dispersed mixture in the first step of the process generally depends on the type of equipment used to compact the mixture. If compacting is accomplished by means of a rotary table press or a briquetting device, 5 to 25 parts by weight of water is sufficient, but if an extrusion press is employed, the amount of water to be added in the first step of the process can be higher, and can reach 100 parts by weight. However, for any given means of compacting the uniformly dispersed mixture, the amount of water to be employed in forming the uniformly dispersed mixture can be readily determined in advance through simple experimentation.

The amount of water employed in forming the uniformly dispersed mixture also depends, to a lesser extent, on the amount of clay and/or other refractory materials employed in forming the mixture. Again, the amount of water can be readily determined through simple experimentation. Generally, larger amounts of water are particularly advantageous when employing colloidal $SiO_2$ and colloidal $Al_2O_3$.

After the mixture has been compacted, it is subjected to one or more heat-treatments, i.e. drying at 110° to 180° C. and/or heat-treating at 250° to 600° C. and/or firing at 800° to 1550° C. Any one of these heat-treatments, or any combination of two or more of them, can be employed, generally depending on the type of equipment used, as will be apparent to those in the art.

Preferably, the compacted mixture is dried at 110° to 180° C. and is then heat-treated at 250° to 600° C. and/or fired at 800° to 1550° C. Heat-treatment at 250° to 600° C. results in the formation of certain chemical bonds in the product due to the presence of the phosphate bonding agent. Firing the product at the higher temperatures, from 800° to 1550° C., improves the constancy of the volume of the granular product.

The time for carrying out each of the heating steps, when employed, is 1 to 30 hours, preferably 2 to 24 hours. However, as concerns the firing step, the above-mentioned improvement in the constancy of the volume of the granular product can be realized even when firing is carried out only from 1 to 8 hours.

After the heating step(s), the thus heated product is subjected to granulation. This can be accomplished by any conventional granulating means, as known to those skilled in the art, for example, standard crushing equipment.

Generally, the maximum particle size of the granules obtained in accordance with the present invention is a standard 6 mm. However granular products can be obtained having a particle size of between 2 and 3 mm by adjusting standard crushing equipment and, if necessary, sifting out the particles of the desired size.

The thus obtained granular material, as produced by the process of the present invention, has a grain density of 0.7 to 1.80 g/cm³ and a pore volume of 35 to 75%.

The granular material obtained in accordance with the present invention is particularly suited for use in fiber spraying-compositions. For this purpose, the granular material can be fed as a dry material into a discharge nozzle and mixed at the head with water and, if necessary, other bonding agents or materials. Alternatively, a paste containing the granular material, water and, if necessary, other materials, can be produced and then sprayed.

It is also possible to spray the granular material of the present invention together with water and other ceramic fibers.

The use of the granular material of the present invention in fiber spraying-compositions has the advantage that less water is needed for spraying, and this can result in as much as a 50% savings in the amount of water employed.

Furthermore, the use of the granular product of the present invention in fiber spraying-compositions has the advantage that the substrates protected by the composition have a higher temperature limit than substrates protected by other fiber spraying-compositions in which no compacting takes place during production of the granular material. Thus, the temperature limit for fiber spraying-compositions based on the granular product of the present invention is 1540° C. after application as tundish masses, as compared to only 1260° C. for similar fiber spraying-compositions which contain the same granular material components but produced without the compacting step. Both of these temperature limits were obtained when using granular material composed of ceramic fibers having an $Al_2O_3$ content of 47% by weight, 9 parts by weight of bentonite, 4 parts by weight of finely dispersed solid aluminum phosphate, calculated as $P_2O_5$, and 6 parts by weight of water, all parts by weight being based on 100 parts by weight of ceramic fibers. The material was heat-treated at 1000° C. The volume coefficient for compacting during production of the granular material in accordance with the present invention was 4.

In particular, the granular product obtained in accordance with the present invention can be used in fiber spraying-compositions to provide an insulating coating for furnaces, or an insulating protective cover for fireproof materials of in-feeds, whereby such fiber spraying-compositions can also be used to insulate the fire-subjected side of existing in-feeds, for example, for repair work.

A particularly advantageous use of the fiber spraying-compositions is for the spraying of boiler room ceilings. Such ceiling coatings are described, for example, in German Patent Specification 28 32 079. For this purpose, temperature-constant fiber material mats are installed with the aid of mounting brackets, and the last layer of the mats is then completely covered with a protective layer of highly temperature-constant lightweight material. Use of the fiber spraying-compositions in accordance with the present invention makes it possible to spray the ceiling construction with the composition which, after it dries, produces a compact insulating layer that does not require a cover plate.

Another use for the granular material of the present invention is for the production of molded parts, for example, injection-molded parts. To accomplish this, the granular material can be used together with other refractory components or other ceramic fibers, clay and a chemical or hydraulic bonding agent, such as clay aluminus cement, or other hydraulic bonding agent, and can be compressed, stamped or die-cast into parts, or together with these other components, can be sprayed into molds.

Another use of the granular material of the present invention is that it can be loosely poured as a filling material into conduits, for example, cable chutes for buildings, manholes, drains, etc., in order to prevent the spread of fires and gas flow.

The following examples illustrate the present invention, without their being any intention to limit the invention.

In these examples, two types of ceramic fibers are employed, namely:

(A) ceramic fibers of the $Al_2O_3$-$SiO_2$ group, containing 47% by weight of $Al_2O_3$ and 53% by weight of $SiO_2$, having a temperature limit of 1260° C., and (B) ceramic fibers of the $Al_2O_3$-$SiO_2$ group, containing 95% by weight of $Al_2O_3$ and 5% by weight of $SiO_2$, 1 having a higher temperature limit, above 1500° C.

EXAMPLE 1

100 parts by weight of ceramic fibers A, 10 parts by weight of bonding clay with an $Al_2O_3$ content of 35% by weight and 1.5 parts by weight of dry, pulverized methyl cellulose were placed into an Eirich mixer and thoroughly mixed for about 10 minutes. Subsequently, 10 parts by weight of a mono-aluminum phosphate solution (50% by weight) and 2 parts by weight of water were sprayed onto the material inside the continuously rotating mixer and mixed in for another 30 minutes.

Following removal from the mixer, the resulting product was compacted in a plate press, at an applied pressure of 30 N/mm², and turned into a plate-shaped product with a thickness of 30 mm. The compacting coefficient was 5.5.

The resulting plate-shaped product was subsequently dried in a furnace for 24 hours at 110° C., fired for 24 hours at the temperatures shown in Table 1, and then crushed to a maximum grain size of 3 mm.

The granular product had the following properties:

TABLE 1

| Firing temperature (°C.) | 800 | 1350 | 1510 |
|---|---|---|---|
| Grain weight per unit volume (g/cm³) | 1.34 | 1.52 | 1.77 |
| Specific weight (g/cm³) | 2.60 | 2.70 | 2.75 |
| pore volume (vol. %)[1] | 47.7 | 43.7 | 35.6 |
| Chemical Analysis (%) | $Al_2O_3$ | 44.7 | |
| | $SiO_2$ | 50.7 | |
| | $P_2O_5$ | 2.95 | |

Note
[1] Pore volume (%) = $\frac{\text{specific weight} - \text{grain weight}}{\text{specific weight}} \times 100$

EXAMPLE 2

The steps in Example 1 were repeated, but a turbomixer was used for breaking up the fibers. The amount of pressure applied in the compacting stage was 10 and 15 N/mm², respectively, the coefficient for compacting was 4 and 5, respectively.

After firing at 1350° C. for 24 hours and crushing the product, the resulting granular material had the following properties:

TABLE 2

| Applied pressure (N/mm²) | 10 | 15 |
|---|---|---|
| Grain weight per unit Volume (g/cm³) | 0.7 | 1.02 |

TABLE 2-continued

| | | |
|---|---|---|
| Specific weight (g/cm³) | 2.7 | 2.7 |
| Pore volume (vol. %) | 74 | 63 |

EXAMPLE 3

The steps in Example 1 were repeated. However, the amount of mono-aluminum phosphate solution was increased to 15 parts by weight and the water was increased to 5 parts by weight while the mixing time was shortened by 20 minutes. Following firing at 1350° C. for 24 hours and crushing, the desired granular product had the following properties:

TABLE 3

| | |
|---|---|
| Grain weight per unit volume (g/cm³) | 1.29 |
| specific weight (g/cm³) | 2.69 |
| pore volume (vol. %) | 53.8 |

EXAMPLE 4

The steps in Example 1 were repeated, but 8 parts by weight of powdered fire clay were added in the mixing stage. Furthermore, only 8.3 parts by weight of the mono-aluminum phosphate solution (50% by weight), but 4 parts by weight of water, were added during the mixing stage.

The amount of pressure applied in the compacting stage was 30 N/mm² which resulted in compacting by a volume coefficient of 5.2.

The resulting plate-shaped product was dried at 180° C. for 24 hours and samples were fired for 24 hours at the various temperatures given in Table 4. Subsequently, the dried or fired product was crushed to a maximum grain size of 3 mm.

The resulting granular product had the following properties:

TABLE 4

| Treatment temperature (°C.) | 180 | 800 | 1200 | 1300 | 1500 |
|---|---|---|---|---|---|
| Grain weight per unit volume (g/cm³) | 1.30 | 1.26 | 1.31 | 1.34 | 1.48 |
| Specific weight (g/cm³) | 2.60 | 2.60 | 2.65 | 2.68 | 2.72 |
| Pore volume (vol. %) | 50.0 | 51.5 | 50.5 | 50.0 | 45.6 |

EXAMPLE 5

The steps in Example 1 were repeated. Instead of the bonding clay, however, 10 parts by weight of finely dispersed, colloidal Al₂O₃ were used. This Al₂O₃ was available as a highly viscous solution, 50% by weight, with a viscosity of 0.083 pascal.second (0.83 poise) at 20° C. At the mixing stage, 8 parts by weight of mono-aluminum phosphate solution (50% by weight) and 3 parts by weight of water were added.

At the compacting stage, the material was compacted at an applied pressure of 30 N/mm², which resulted in a volume coefficient of 5.4.

Further treatment took place as in Example 1. However, the drying temperature was 120° C. (24 hours) and samples of the plate-shaped material were fired for 24 hours at various temperatures listed in Table 5. Subsequently, the material was crushed as in Example 1.

The granular product had the following properties:

TABLE 5

| Treatment temperature (°C.) | 120 | 800 | 1200 | 1300 | 1500 |
|---|---|---|---|---|---|
| Grain weight per unit volume (g/cm³) | 1.34 | 1.32 | 1.38 | 1.39 | 1.44 |
| Specific weight (g/cm³) | 2.72 | 2.72 | 2.77 | 2.79 | 2.83 |
| Pore volume (vol. %) | 50.7 | 51.5 | 50.2 | 50.1 | 49.1 |

EXAMPLE 6

The steps in Example 1 were repeated with the exception that the 50% mono-aluminum phosphate solution was replaced in the mixing mstage by solid sodium polyphosphate (5 parts by weight). The amount of water used was 9 parts by weight.

During compacting with an applied pressure of 30 N/mm², a volume coefficient of 5.3 was reached.

Further treatment took place as in Example 1, except that the drying temperature was 120° C. (24 hours). The following table lists the properties of the granular product obtained from the dried product or the product fired for 24 hours at various temperatures.

TABLE 6

| Treatment temperature (°C.) | 120 | 800 | 1200 | 1300 | 1500 |
|---|---|---|---|---|---|
| Grain weight per unit volume (g/cm³) | 1.22 | 1.19 | 1.32 | 1.38 | 1.41 |
| Specific weight (g/cm³) | 2.60 | 2.61 | 2.65 | 2.69 | 2.73 |
| Pore Volume (vol. %) | 53.1 | 54.4 | 50.1 | 48.6 | 48.4 |

EXAMPLE 7

In this example, compacting was done with the aid of an extrusion press.

First of all, 100 parts by weight of ceramic fibers B and 1.5 parts by weight of dry methyl cellulose were mixed in an Eirich mixer for 10 to 20 minutes. Following that, 10 parts by weight of the bonding clay used in Example 1 and 2 parts by weight of finely dispersed chromium oxide with a maximum particle size of 63 μm were placed into the continuously running mixer and mixed in for a short time. Subsequently, 10 parts by weight of a 50% by weight solution of mono-aluminum phosphate and 80 parts by weight of water were added and thoroughly mixed in. Compacting was done in a standard extrusion press installation, whereby the jet had a diameter of 250 × 190 mm. The volume coefficient during compacting was 3.9. The material flowing out of the jet was cut off in suitable chunks, which were then dried at 110° C. for 24 hours and fired for another 24 hours at the various temperatures given in Table 7. Following that, the sample chunks were crushed to a granulation of maximum 6 mm.

The properties of the resultant granular product were as follows:

TABLE 7

| Treatment temperature (°C.) | 110 | 900 | 1100 | 1300 | 1500 |
|---|---|---|---|---|---|
| Grain weight per unit volume (g/cm³) | 0.90 | 0.87 | 0.92 | 1.00 | 1.27 |
| Specific weight (g/cm³) | 2.60 | 2.61 | 2.63 | 2.65 | 2.73 |
| Pore volume (vol. %) | 65.4 | 66.6 | 65.0 | 62.2 | 53.5 |

EXAMPLE 8

In this example, 100 parts by weight of fibers, together with 1.5 parts by weight of dry methyl cellulose, were initially broken up during 20 minutes in a turbomixer. Subsequently, 10 parts by weight of solid, colloidal SiO₂ were added and mixed with the fibers. Following that, 8 parts by weight of solid, pulverized mono-aluminum phosphate and 8 parts by weight of water were added and mixed another 12 minutes.

The resulting, crumb-like mixture was compacted in a briquetting installation at a volume coefficient of 4.9 and then dried for 24 hours at 120° C. One of the samples was heat-treated at 400° C. for 24 hours without previous drying, and another was fired for 24 hours at 1000° C. also without previous drying and without previous heat-treatment.

The resulting, treated samples were crushed to a maximum grain size of 4 mm and exhibited the following properties:

TABLE 8

| Treatment temperature (°C.) | 120 | 400 | 1000 |
|---|---|---|---|
| Grain weight per unit volume (g/cm³) | 1.15 | 1.10 | 1.13 |
| Specific weight (g/cm³) | 2.58 | 2.57 | 2.65 |
| Pore volume (vol. %) | 55.4 | 57.2 | 57.3 |

EXAMPLE 9

Together with a mixing fluid consisting of 2 parts by weight of water and 1 part by weight of 50% by weight of mono-aluminum phosphate solution, the granular product obtained in Example 4, which was fired at 800° C., was sprayed with a standard squirt gun (Velco type) into hollow ceiling spaces and onto a vertical wall, at a thickness of 150 mm. Following heat-treatment to dry the sprayed-on layer, an excellent insulation layer resulted. After a period of 20 days, samples were taken from the wall, which had been kept at a temperature of about 1200° C. during that period. The samples had the following properties:

TABLE 9

| Gross density (g/cm³) | 1.6 |
|---|---|
| Cold compression strength (N/mm²) | 7.9 |
| Cold bending strength (N/mm²) | 3.0 |
| Heat conductivity at 700° C. (W/m ° K.) | 0.4 |

EXAMPLE 10

100 parts by weight of the granular product produced in Example 5, which was fired at 1300° C., 20 parts by weight of clay aluminous cement (Alcoa 25 type) and 18 parts by weight of water were mixed for 10 minutes in a forced-movement mixer (Eirich type), and then tamped into 200×200×200 mm stone molds. Following hardening, these stones were first dried for 12 hours at 110° C. and then fired for 24 hours at 1300° C. The properties of these stones were as follows:

TABLE 10

| | after drying | after 24 hrs at 1300° C. |
|---|---|---|
| Gross density (g/cm³) | 1.5 | 1.6 |
| Cold compression strength (N/mm²) | 1.5 | 23.0 |
| Cold bending strength (N/mm²) | 0.5 | 7.1 |
| Heat conductivity at 700° C. (W/m °K.) | | 0.42 |

We claim:

1. A process for producing a granular, fire-resistant material, which comprises:
   mixing 100 parts by weight of ceramic fibers, 2 to 15 parts by weight of at least one member selected from the group consisting of clay, Al₂O₃, SiO₂, aluminum hydroxide, magnesium oxide, titanium dioxide and chromium oxide, 1 to 8 parts by weight, as P₂O₅, of a phosphate bonding agent, and about 2 to about 25 parts by weight of water, to form a substantially uniformly dispersed mixture,
   compacting said mixture by a volume coefficient of at least 3,
   subjecting said compacted mixture to at least one heat-treatment selected from the group consisting of drying at 110° to 180° C., heat-treating at 250° to 600° C., and firing at 800° to 1550° C., and
   granulating the thus heated product.

2. A process according to claim 1, wherein said uniformly dispersed mixture further contains a positive amount of up to 10 parts by weight of another refractory material.

3. A process according to claim 1, wherein said uniformly dispersed mixture further contains a positive amount of up to 10 parts by weight of another refractory material selected from the group consisting of powdered porcelain and a fire-resistant clay other than said clay referred to in claim 1.

4. A process according to claim 1 or 2, wherein said uniformly dispersed mixture further contains a plasticizer.

5. A process according to claim 4, wherein the amount of said plasticizer is 1 to 10 parts by weight.

6. A process according to claim 5, wherein said plasticizer is methyl cellulose and is used in an amount of 1 to 6 parts by weight.

7. A process according to claim 1, wherein said ceramic fibers are individual ceramic fibers which are separate from each other.

8. A process according to claim 1, wherein said clay is used to prepare said uniformly dispersed mixture.

9. A process according to claim 8, wherein said clay is bentonite.

10. A process according to claim 1, wherein said phosphate bonding agent is sodium polyphosphate.

11. A process according to claim 10, wherein said sodium polyphosphate has a polymerization degree of at least 4.

12. A process according to claim 11, wherein said sodium polyphosphate has a polymerization degree of 6 to 10.

13. A process according to claim 1, 2, 3, 7, 8 or 9, wherein said phosphate bonding agent is mono-aluminum phosphate in powdered form or as an aqueous solution.

14. A process according to claim 1, wherein said ceramic fibers are fibers of aluminum silicate containing 45 to 95% by weight of Al₂O₃.

15. A process according to claim 1, wherein said mixture is compacted by a volume coefficient of 3 to 14.

16. A process according to claim 15, wherein said mixture is compacted by a volume coefficient of 3 to 8.

17. A process according to claim 16, wherein said mixture is compacted by a volume coefficient of 3 to 6.

18. A process according to claim 16, wherein said mixture is compacted by a volume coefficient of 5 to 8.

19. A process according to claim 1, wherein said compacting is carried out by briquetting said uniformly dispersed mixture.

20. A process according to claim 1, wherein each of said heat-treatments, when employed, is carried out for 1 to 30 hours.

21. A process according to claim 1, wherein said granulating is carried out to produce granules having a maximum particle size of 6 mm.

22. A process for producing a granular, fire-resistant material, which comprises:

mixing 100 parts by weight of ceramic fibers, 2 to 15 parts by weight of at least one member selected from the group consisting of clay, $Al_2O_3$, $SiO_2$, aluminum hydroxide, magnesium oxide, titanium dioxide and chromium oxide, 1 to 8 parts by weight, as $P_2O_5$, of a phosphate bonding agent, and more than 25 parts, up to 100 parts, by weight of water, to form a substantially uniformly dispersed mixture, compacting said mixture in an extrusion press by a volume coefficient of at least 3, subjecting said compacted mixture to at least one heat-treatment selected from the group consisting of drying at 110° to 180° C., heat-treating at 250° to 600° C., and firing at 800° to 1550° C., and granulating the thus heated product.

23. A process according to claim 22, wherein said uniformly dispersed mixture further contains a positive amount of up to 10 parts by weight of another refractory material.

24. A process according to claim 22 or 23, wherein said uniformly dispersed mixture further contains a plasticizer.

25. A process according to claim 24, wherein the amount of said plasticizer is 1 to 10 parts by weight.

* * * * *